US012429127B2

(12) United States Patent
Spengler et al.

(10) Patent No.: US 12,429,127 B2
(45) Date of Patent: Sep. 30, 2025

(54) TRANSMISSION DEVICE FOR A MOTOR VEHICLE

(71) Applicant: Dr. Ing. h.c. F. Porsche Aktiengesellschaft, Stuttgart (DE)

(72) Inventors: Gerhard Spengler, Jettingen (DE); Thorsten Wunsch, Wimsheim (DE); Simon Martin, Muehlacker (DE); Kaspar Kraxner, Wiernsheim (DE); Andre Geisser, Jettingen (DE); Andreas Tippmann, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 51 days.

(21) Appl. No.: 18/353,129

(22) Filed: Jul. 17, 2023

(65) Prior Publication Data
US 2024/0026965 A1 Jan. 25, 2024

(30) Foreign Application Priority Data
Jul. 21, 2022 (DE) ...................... 10 2022 118 293.2

(51) Int. Cl.
*F16H 57/04* (2010.01)
(52) U.S. Cl.
CPC ..... *F16H 57/0423* (2013.01); *F16H 57/0409* (2013.01); *F16H 57/0452* (2013.01)
(58) Field of Classification Search
CPC ............. F16H 57/0409; F16H 57/0423; F16H 57/045; F16H 57/0457; F16H 57/0427
See application file for complete search history.

(56) References Cited

U.S. PATENT DOCUMENTS

| 3,529,698 | A | * | 9/1970 | Nelson | F16H 57/0447 |
| | | | | | 184/6.12 |
| 3,601,515 | A | * | 8/1971 | Pelizzoni | F16H 57/0493 |
| | | | | | 184/6.12 |
| 4,270,497 | A | * | 6/1981 | Valerio | F01M 11/0004 |
| | | | | | 184/106 |

(Continued)

FOREIGN PATENT DOCUMENTS

| DE | 102017203527 A1 | 9/2018 |
| DE | 102018203696 A1 | 9/2019 |

(Continued)

*Primary Examiner* — Michael A Riegelman
(74) *Attorney, Agent, or Firm* — LEYDIG, VOIT & MAYER, LTD.

(57) ABSTRACT

A transmission device for a motor vehicle includes a gearwheel space, a gearwheel received in the gearwheel space and having at least one oil bunker for supplying oil for lubricating the gearwheel, and at least one oil return device. The oil is conveyable from the oil bunker into the gearwheel space. At least one oil sump for catching the oil is arranged in the gearwheel space. At least one partition is arranged between the oil bunker and the oil sump for separating the oil sump from the oil bunker. The at least one oil return device includes at least one wiper for wiping the oil from the gearwheel and at least one outlet for removing the wiped oil into the oil bunker. The wiper and the outlet are arranged on different sides of the at least one partition and are connected by at least one fluid connection.

14 Claims, 2 Drawing Sheets

(56) References Cited

U.S. PATENT DOCUMENTS

| | | | | |
|---|---|---|---|---|
| 4,347,759 | A | * | 9/1982 | Renk ......................... F16N 7/28 |
| | | | | 74/606 R |
| 4,378,711 | A | * | 4/1983 | Daniel ................ F16H 57/0421 |
| | | | | 184/6.12 |
| 4,470,324 | A | * | 9/1984 | Renk .................. F16H 57/0423 |
| | | | | 74/606 R |
| 4,630,711 | A | * | 12/1986 | Levrai ....................... F16N 7/28 |
| | | | | 184/6.12 |
| 6,616,432 | B2 | * | 9/2003 | Szczepanski ........... F04C 2/082 |
| | | | | 184/6.12 |
| 7,213,682 | B2 | * | 5/2007 | Gibson ............... F16H 57/0421 |
| | | | | 184/6.12 |
| 8,534,425 | B2 | * | 9/2013 | Jabs .................... F16H 57/0447 |
| | | | | 184/11.1 |
| 9,435,421 | B2 | * | 9/2016 | Mafune ............... F16H 57/0483 |
| 10,208,848 | B2 | * | 2/2019 | Hotait ................ F16H 57/0463 |
| 11,662,013 | B2 | * | 5/2023 | Tamai .................... H02K 7/116 |
| | | | | 184/6.12 |
| 12,129,919 | B2 | * | 10/2024 | Dallapiccola ....... F16H 57/0409 |
| 2008/0128212 | A1 | * | 6/2008 | Utzat ................ F16H 57/0427 |
| | | | | 192/70.12 |
| 2015/0204436 | A1 | * | 7/2015 | Mafune ............... F16H 57/0409 |
| | | | | 475/160 |
| 2018/0238434 | A1 | * | 8/2018 | Zhang ................ F16H 57/0423 |
| 2020/0132183 | A1 | * | 4/2020 | Günnel ............... F16H 57/0495 |
| 2024/0026965 | A1 | * | 1/2024 | Spengler ............ F16H 57/0409 |

FOREIGN PATENT DOCUMENTS

| | | |
|---|---|---|
| JP | 2020172994 A | 10/2020 |
| WO | WO 2014017301 A1 | 1/2014 |

* cited by examiner

TRANSMISSION DEVICE FOR A MOTOR VEHICLE

CROSS REFERENCE TO RELATED APPLICATIONS

This application claims benefit to German Patent Application No. DE 10 2022 118 293.2, filed on Jul. 21, 2022, which is hereby incorporated by reference herein.

FIELD

The present invention relates to a transmission device for a motor vehicle, having at least one gearwheel space and having at least one gearwheel received therein.

BACKGROUND

In such transmission devices, there is often provided an oil sump in the gearwheel space in which dripping oil can be caught. Most of the time, the oil bunker and the oil sump are a common reservoir. Then, the oil caught in the oil sump is available for the oil bunker again and can be conveyed to the gearwheel space again from there.

However, for constructive reasons for the transmission and also from a lubrication perspective, it can be advantageous to separate the oil sump from the oil bunker by way of a partition. Thus, such transmission devices can experience an undesirably high oil level in the oil sump. This in turn causes splash losses and a reduced fill quantity in the oil bunker.

SUMMARY

In an embodiment, the present disclosure provides a transmission device for a motor vehicle, comprising at least one gearwheel space, at least one gearwheel received in the gearwheel space and having at least one oil bunker for supplying oil for lubricating the gearwheel, and at least one oil return device. The oil is conveyable from the oil bunker into the gearwheel space. At least one oil sump for catching the oil is arranged in the gearwheel space. At least one partition is arranged between the oil bunker and the oil sump for separating the oil sump from the oil bunker. The at least one oil return device includes at least one wiper for wiping the oil from the gearwheel and at least one outlet for removing the wiped oil into the oil bunker. The wiper and the outlet are arranged on different sides of the at least one partition and are connected by at least one fluid connection.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
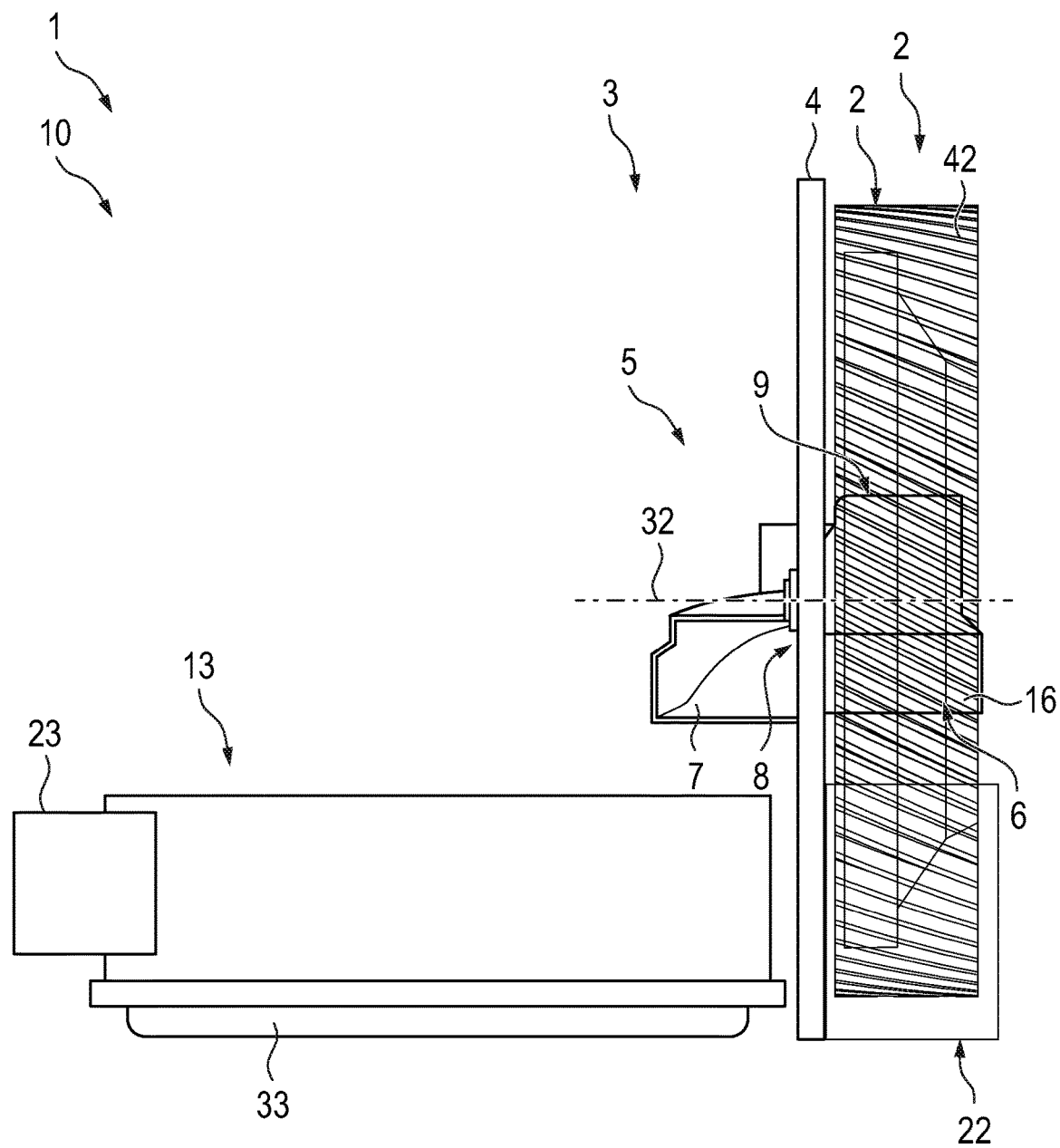
FIG. 1 illustrates a schematic illustration of a transmission device according to an embodiment of the invention in a sectioned and partially transparent side view.

In an embodiment, the present invention provides an improved transmission device in comparison thereto. An opportunity is created to counteract an increased oil level in the oil sump with little effort and at the same time with as little need for construction space and weight as possible.

An oil return device according to an embodiment of the invention is provided. Additional advantages and features of embodiments of the present invention are disclosed in the general description and the description of the exemplary embodiment.

The transmission device according to an embodiment of the invention is provided for a motor vehicle and is in particular configured as a differential transmission. The transmission device comprises at least one gearwheel space and at least one gearwheel accommodated in the gearwheel space. The transmission device comprises at least one oil bunker for supplying oil for lubricating the gearwheel. The oil is (while in operation) conveyable from the oil bunker into the gearwheel space. At least one oil sump for catching (dripping) oil is arranged in the gearwheel space (in particular at least below the gearwheel). At least one partition is arranged between the oil bunker and the oil sump (and in particular at least a part of the gearwheel space). The partition serves in particular for separating the oil sump from the oil bunker. The transmission device comprises at least one oil return device with at least one wiper unit for wiping the oil from the gearwheel. The oil return device comprises at least one outlet unit for draining the wiped oil into the oil bunker. The wiper unit and the outlet unit are arranged on different and in particular opposing (axial) sides of the partition. The wiper unit and the outlet unit are connected to one another by means of at least one fluid connection. In particular, the oil can be returned to the oil bunker from the oil sump while overcoming the partition.

The transmission device according to an embodiment of the invention offers many advantages. A significant advantage is provided by the oil return device, which, despite the partition, can passively return the oil from the oil sump to the oil bunker, for example without a pump or the like. Such an oil return device can be implemented in a low-effort and at the same time space-saving and low-weight manner. In embodiments of the invention, a too high oil level in the oil sump caused by the partition is simply and economically prevented by utilizing the rotation of the gearwheel.

Preferably, the wiper unit comprises at least one wiper edge facing the gearwheel. In particular, the wiper edge is arranged on a radial exterior (can also be referred to as the front side) of the gearwheel. In particular, the wiper edge is arranged on a keying side of the gearwheel. In particular, the wiper edge is arranged on the gearwheel (preferably only) radially on the front side. The wiper edge can abut the gearwheel while contacting it (in particular at least during the wiping). However, it is also possible and advantageous that the wiper edge (with a targeted clearance) is arranged spaced apart from the gearwheel. At least a majority of the wiper unit, in particular the wiper edge, is arranged in the same axial position as the gearwheel.

In particular, the wiper edge runs parallel to an axis of rotation of the gearwheel and/or at an angle (not parallel) to a helical keying. In particular, the wiper edge runs horizontally. This provides many advantages for the wiping process, especially in the case of a helical keying. However, it is also possible that the wiper edge is not arranged parallel to an axis of rotation of the gearwheel and/or at an angle (not parallel) to a straight keying.

In an advantageous configuration, the wiper edge and the outlet unit are arranged deeper than an axis of rotation of the gearwheel. In particular, the outlet unit is deeper than the wiper edge. In particular, the outlet unit is arranged axially adjacent the gearwheel.

The wiper unit can comprise walls, via which the wiped oil is directed from the wiper edge to the fluid connection. The wiper unit can also comprise at least one collection section in which the wiped oil is collected before flowing to the fluid connection.

In a preferred and advantageous configuration, the oil return device comprises at least one collection funnel that is open on top. The collection funnel is used in particular to collect oil dripping within the gearwheel space (downward). As a result, splash losses and a reduced fill quantity in the oil bunker can be avoided even more reliably.

The collection funnel preferably comprises at least one funnel opening. In particular, the funnel opening is arranged higher than at least the wiper unit and preferably the wiper edge. In particular, the funnel opening is arranged above the wiper unit. In particular, the funnel opening lies higher than the axis of rotation of the gearwheel. In particular, the funnel opening lies deeper than a radially topmost end of the gearwheel.

In an advantageous embodiment, the collection funnel is connected to the fluid connection (fluidically). In particular, the oil caught with the collection funnel can be fed back into the oil bunker via the fluid connection and in particular also the outlet unit. This allows for a particularly uncomplicated and compact yet impactful return.

It is preferred and advantageous that the collection funnel has at least one access opening on a side face that faces the gearwheel. Preferably, the oil wiped by the wiper unit can pass through the access opening to the fluid connection. In particular, the access opening is arranged above the wiper edge.

It is also preferred and advantageous that the collection funnel is formed with a curvature on a side face that faces the gearwheel. Preferably, the curvature has a radius corresponding to a radius of the gearwheel. In particular, the curvature follows the radial exterior of the gearwheel with a spacing. In particular, the curvature is arranged on the side face on which the access opening is also arranged.

In all embodiments, it is preferred and advantageous that the wiper unit and the outlet unit and the fluid connection, and preferably also the collection funnel, are integrally connected to one another. Preferably, the entire oil return device is integrally formed. For example, the oil return device is provided by a plastic component. It is possible for the transmission device to comprise mounting means that allow the oil return device to be secured to the partition and/or to a transmission housing.

The oil return device according to an embodiment of the invention serves for use in the transmission device described above. Preferably, the oil return device is configured as has been previously described for the transmission device. Such an oil return device also solves the previously addressed problem particularly advantageously.

In particular, the transmission device comprises a plurality of gearwheels, wherein at least a portion of the gearwheels are each associated with at least one oil return device. The transmission device can comprise at least one transmission housing in which the components of the transmission device are enclosed. The partition can be formed or fixed to the gearwheel box.

In particular, the oil is actively conveyable, preferably by means of a conveyor device, from the oil bunker into the gearwheel space. In particular, the oil is conveyed into the gearwheel space such that it is ready to lubricate the gearwheel there. For example, the oil can be conveyed onto the gearwheel and/or into the oil sump. In particular, in an operating position when used as intended, the oil from the oil sump cannot drain into the oil bunker due to the partition. In particular, the oil in the fluid connection flows counter to the conveying direction of the conveyor device.

The oil return device is in particular passively formed. The oil return device serves in particular to return the oil from the gearwheel space to the oil bunker. In particular, the oil return device is used in order to return at least a part of the oil, which is carried along from the oil sump by way of an operation-based rotation of the gearwheel via the teeth or tooth gaps. In particular, the oil within the fluid connection flows passively due to gravity and/or hydraulic pressure of the wiped oil.

In the context of embodiments of the present invention, the terms "higher" and "lower" relate in particular to a vehicle vertical axis i.e., the Z-axis of the vehicle coordinate system at an intended operating position of the transmission device in the motor vehicle. In the context of embodiments of the present invention, the oil is understood to refer to any type of liquid lubricant that is suitable for the transmission device.

In particular, the oil return device is arranged higher than an operational oil level in the oil bunker and/or oil sump. In particular, the axis of rotation of the gearwheel is arranged higher than the oil level in the oil bunker and/or oil sump. The oil bunker and the oil sump are arranged in particular deeper than an axis of rotation of the gearwheel. The oil bunker is located above an oil pan, in particular. In particular, a lower radial end of the gearwheel is arranged below the oil level in the oil sump. In particular, the gearwheel is arranged so as to partially be immersed in the oil of the sump.

With respect to an operative direction of rotation of the gearwheel (in particular when driving forwards), the wiper unit lies preferably downstream of the oil sump and upstream of a radially upper end of the gearwheel. In particular, the fluid connection connects two regions separated by the partition. In particular, the fluid connection penetrates and/or bypasses the partition. In particular, the wiper unit and the outlet unit are arranged on opposite axial sides of the partition.

In particular, the fluid connection and the collection funnel are arranged radially further outward than the gearwheel. In particular, the outlet unit is arranged axially adjacent the gearwheel. In particular, the outlet unit is arranged radially further inside than the wiper edge and/or the radial exterior of the gearwheel. In particular, the outlet unit lies at least partially deeper than the wiper edge and/or the fluid connection. The fluid connection extends in particular from radially outside the gearwheel on a side axially adjacent the gearwheel and thereby radially further inside than the radial exterior of the gearwheel.

In particular, the collection funnel is arranged on the (axial) side of the partition on which the wiper unit is also arranged. In particular, at least a majority of the collection funnel is arranged in the same axial position as the gearwheel. The collection funnel is arranged in particular at least partially radially adjacent the gearwheel.

Further advantages and features of embodiments of the present invention follow from the exemplary embodiments, which are described below with reference to the accompanying drawings.

FIG. 1 shows a transmission device 1 according to an embodiment of the invention, which is configured here as a differential transmission 10 for a drive train of a motor vehicle. The transmission device 1 comprises a plurality of gearwheels 12, one of which is shown here.

The gearwheel 12 is received in a gearwheel space 2 and has a keying 42 configured as a helical keying. While in operation, the gearwheel 12 rotates about an axis of rotation 32.

An oil bunker 3 is provided for supplying oil 13 for lubricating the gearwheel 12. The oil bunker 3 is located above an oil pan 33. Below the gearwheel 12 in the gearwheel space 2, an oil sump 22 is formed in which the oil 13 dripping from the gearwheel 12 can be caught.

While in operation, the oil 13 is sucked from the oil bunker 3 by means of a conveyor device 23, for example an oil pump, and is actively conveyed into the gearwheel space 2 and conveyed there e.g., to the gearwheel 12, to the oil sump 22, or to other lubricating locations. This oil 13 essentially (again) runs into the oil sump 22 after lubrication.

A partition 4 is arranged between the oil bunker 3 and the oil sump 22. As a result, the oil 13 located in the oil sump 22 is separated from the oil bunker 3 so that it cannot flow back into the oil bunker 3 on its own under operational conditions. Due to the partition 4, an undesirably high oil level can occur in the oil sump 22. This increases the splash losses and reduces the suckable volume of oil in the oil bunker 3.

Figure 2:
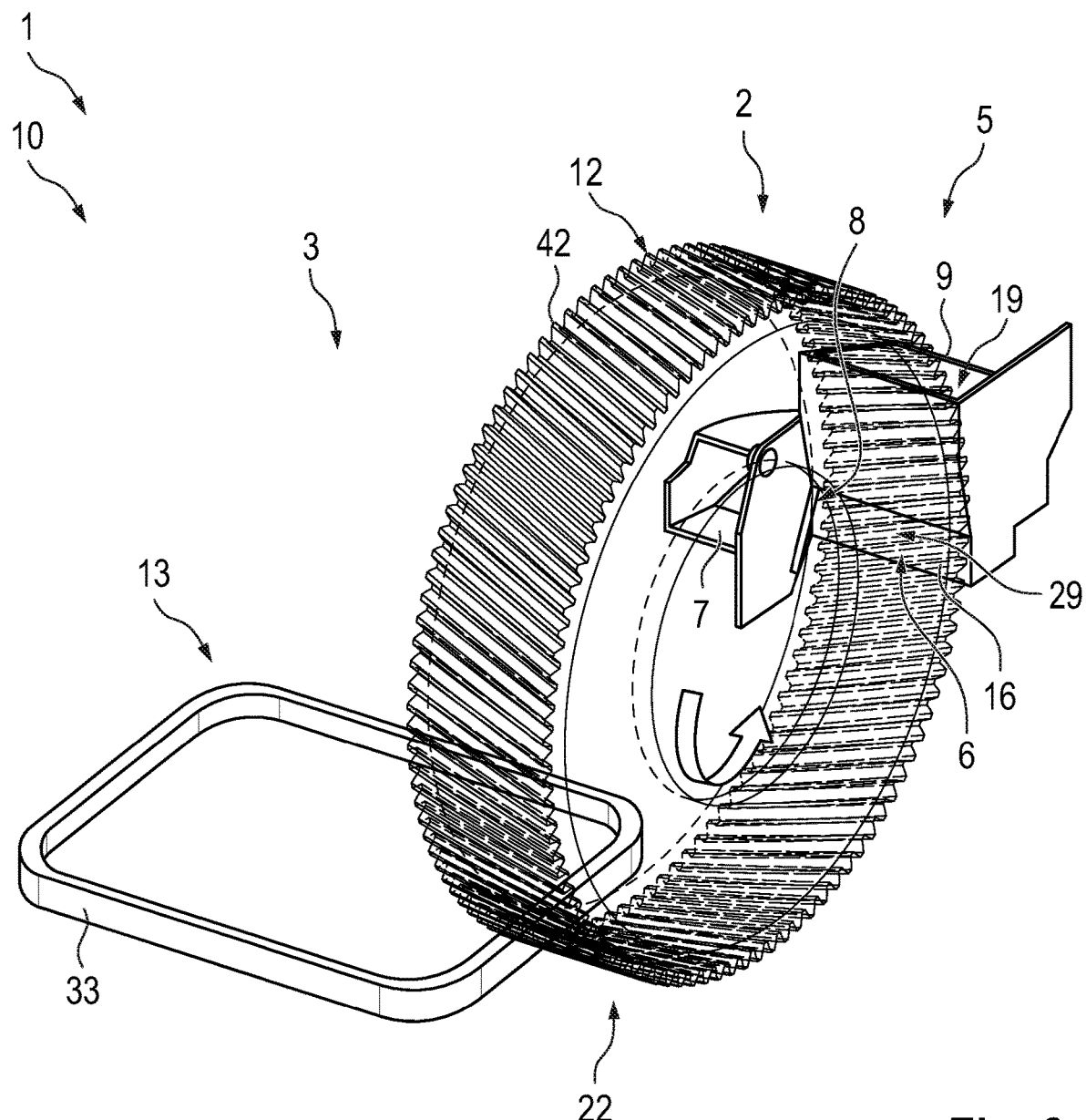
FIG. 2 illustrates the transmission device of FIG. 1 in a partially transparent perspective view from obliquely above.

The transmission device 1 is therefore equipped with an oil return device 5, which returns the oil 13 to the oil bunker 3, starting from the oil sump 22. The function of the oil return device 5 is described in further detail below with reference to FIGS. 1 and 2. For better visibility of the oil return device 5, the gearwheel 12 is shown partially transparent. The direction of rotation of the gearwheel 12 as it travels forward is outlined here by a block arrow.

The oil return device 5 comprises a wiper unit 6 for removing the oil 13 from the gearwheel 12 and an outlet unit 7 for introducing the wiped oil 13 into the oil bunker 3, as well as a fluid connection 8. The fluid connection 8 connects the wiper unit 6 to the outlet unit 7 and thus allows the partition 4 to be overcome. The wiper unit 6 and the outlet unit 7 are arranged deeper than the axis of rotation 32.

The oil return device 5 is integrally formed and is configured as a plastic part, for example.

To remove the oil 13, the wiper unit 6 is equipped with a wiper edge 16. The rotation of the gearwheel 12 while in operation removes oil 13 from the oil sump 22 via the tooth gaps or keying 42 and then wipes it from the wiper edge 16.

The wiped oil 13 is then discharged via the fluid connection 8 through the partition 4 and/or past the partition 4 to the other axial side of the partition 4. There, the oil 13 passes to the outlet unit 7 and from there drips back into the oil bunker 3. The oil 13 can then be sucked up again and conveyed back into the gearwheel space 2.

The oil return device 5 is equipped with a collection funnel 9 that is open on top. The collection funnel 9 comprises a funnel opening 19, which is arranged higher than the wiper unit 6. As a result, oil 13 that drips in the gearwheel space 12 from the gearwheel 12 or other areas can be caught directly.

The collection funnel 9 is also connected to the fluid connection 8, so that the caught oil 13 is likewise returned to the oil bunker 3 via the fluid connection 8 and the outlet unit 7.

The collection funnel 9 has an access opening 29 on a side face that faces the gearwheel 12. The oil 13 wiped by the wiper unit 6 reaches the fluid connection 8 via this access opening 29. In addition, the side face with the access opening 29 is formed with a curvature. The radius of the curvature corresponds to the radius of the gearwheel 12

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Transmission device
2 Gearwheel space
3 Oil bunker
4 Partition
5 Oil return device
6 Wiper unit
7 Outlet unit
8 Fluid connection
9 Collection funnel
10 Differential transmission
12 Gearwheel
13 Oil
16 Wiper edge
19 Funnel opening
22 Oil sump
23 Conveyor device
29 Access opening
32 Axis of rotation
33 Oil pan
42 Keying

The invention claimed is:

1. A transmission device for a motor vehicle, comprising:
at least one gearwheel space;
at least one gearwheel received in the gearwheel space and having an axis of rotation, a radial exterior about the axis of rotation, and at least one oil bunker for supplying oil for lubricating the gearwheel;
wherein the oil is conveyable from the oil bunker into the gearwheel space,
wherein at least one oil sump for catching the oil is arranged in the gearwheel space, wherein at least one partition is arranged between the oil bunker and the oil sump for separating the oil sump from the oil bunker; and at least one oil return device disposed at the at least one partition, the oil return device including at least one wiper for wiping the oil from the gearwheel and at least one outlet for removing the wiped oil into the oil bunker, wherein the wiper and the outlet are arranged on different sides of the at least one partition and are connected by at least one fluid connection, wherein the outlet is arranged radially inside the radial exterior of the gearwheel.

2. The transmission device according to claim 1, wherein the wiper comprises at least one wiper edge facing the gearwheel.

3. The transmission device according to claim 2, wherein the wiper edge and the outlet are arranged between an axis of rotation of the gearwheel and the oil sump.

4. The transmission device according to claim 1, wherein the oil return device comprises at least one collection funnel which is open on top for catching oil that drips within the gearwheel space.

5. The transmission device according to claim 4, wherein the collection funnel comprises a funnel opening which is arranged higher than the wiper.

6. The transmission device according to claim 4, wherein the collection funnel is connected to the fluid connection, so that oil caught with the collection funnel can also be fed back into the oil bunker via the fluid connection.

7. The transmission device according to claim 4, wherein the collection funnel comprises, on a side face that faces the gearwheel, at least one access opening through which oil wiped off by the wiper can arrive at the fluid connection.

8. The transmission device according to claim 4, wherein the collection funnel is formed with a curvature at a side face that faces the gearwheel, and wherein the curvature has a radius corresponding to a radius of the gearwheel.

9. The transmission device according to claim 1, wherein at least the wiper, the outlet, and the fluid connection are integrally connected to one another.

10. An oil return device for the transmission device according to claim 1.

11. The transmission device according to claim 1, wherein the oil return device is integrally formed with the partition.

12. The transmission device according to claim 1, wherein the partition separates the oil sump from the oil bunker and configured to prevent fluid communication between an oil level in the oil sump and an oil level in the oil bunker across the oil return device.

13. The transmission device according to claim 1,
wherein the outlet is further arranged axially adjacent to the gearwheel,
wherein the wiper is arranged in the same axial position as the gearwheel and radially disposed to the gearwheel radial exterior.

14. A transmission device for a motor vehicle, comprising:
at least one gearwheel space;
at least one gearwheel received in the gearwheel space and having at least one oil bunker for supplying oil for lubricating the gearwheel;
wherein the oil is conveyable from the oil bunker into the gearwheel space,
wherein at least one oil sump for catching the oil is arranged in the gearwheel space,
wherein at least one partition is arranged between the oil bunker and the oil sump for separating the oil sump from the oil bunker; and
at least one oil return device disposed at the at least one partition, the oil return device including at least one wiper for wiping the oil from the gearwheel and at least one outlet for removing the wiped oil into the oil bunker,
wherein the wiper and the outlet are arranged on different sides of the at least one partition and are connected by at least one fluid connection,
wherein the partition separates the oil sump from the oil bunker and configured to prevent fluid communication between an oil level in the oil sump and an oil level in the oil bunker across the oil return device.

* * * * *